Nov. 26, 1957  M. L. SWEENEY, JR  2,814,362
VIBRATION DAMPING APPARATUS
Filed Dec. 6, 1954  2 Sheets-Sheet 1

INVENTOR.
MORGAN L. SWEENEY, JR.
BY Elliott & Pastoriza
ATTORNEYS

Nov. 26, 1957  M. L. SWEENEY, JR  2,814,362
VIBRATION DAMPING APPARATUS
Filed Dec. 6, 1954  2 Sheets-Sheet 2

INVENTOR.
MORGAN L. SWEENEY, JR.
BY Elliott & Pastoriza
ATTORNEYS

United States Patent Office 2,814,362
Patented Nov. 26, 1957

2,814,362

VIBRATION DAMPING APPARATUS

Morgan L. Sweeney, Jr., Los Angeles, Calif.

Application December 6, 1954, Serial No. 473,133

7 Claims. (Cl. 188—93)

This invention relates generally to apparatus for damping mechanical vibrations and is particularly addressed to an improved mechanism for damping relatively high frequency, small amplitude oscillations characteristic of certain types of buffeting action or fluttering of control surfaces in moving aircraft.

Effective damping of the more destructive type fluttering experienced by aircraft, particularly when traveling at speeds close to Mach 1, presents many problems. The fluttering action usually takes the form of small amplitude harmonic vibrations having frequencies ranging from 1 to 50 cycles per second. Designing suitable fluid type damping apparatus capable of dissipating the energy of such small amplitude relatively high frequency vibrations is particularly difficult because of the inherent inertia and elasticity of the mechanical components comprising the damping structure. Another difficulty arises from the requirement that a fluid damping mechanism suitable for use on aircraft must be able to operate over fairly wide temperature ranges. Therefore, the problems of varying fluid viscosity, possible leakage, and the accommodation of thermal expansion and contraction of the damping fluid must be overcome.

Heretofore, aircraft damping mechanisms have been employed for damping relatively slow hunting oscillations characteristic, for example, of hydraulic or servo-operated control surfaces. These damping systems often take the form of a rotor element having a laterally directed vane disposed within a damping fluid chamber. The rotor is mechanically coupled or otherwise secured to a hinge shaft associated with the control surface or other aircraft component subject to oscillations. Movement of the vane through the damping fluid chamber as a result of shaft movement forces the fluid from one side of the vane, through a passage incorporating an orifice or needle valve structure, to the opposite side of the vane. The rate at which the fluid can flow and thus the resisting torque offered to the vane by the fluid can be controlled by the size of the orifice.

It will be readily appreciated that if the above type damping mechanism is subjected to a relatively high frequency, small amplitude vibration, the inertia of the vane, as well as of the fluid in being forced rapidly back and forth through a needle valve controlled passageway would be considerable. If the amplitude of the high frequency vibrations were a relatively small percent of the total movement of which the vane were capable, the rapid oscillatory movement of the input shaft would largely be accommodated by the elastic nature of the physical structure, so that a large portion of the vibrational energy would not be dissipated but rather simply reflected back to the input shaft.

The problem of compensating for fluid leaks as well as for thermal expansion and contraction of the damping fluid when subjected to wide temperature variations is particularly troublesome in the case of small amplitude, high frequency vibrations. For example, if an auxiliary fluid reservoir is employed for compensating purposes, passage of the fluid between this reservoir and the main fluid chamber must be relatively rapid if effective compensation is to be achieved. If rapid compensation cannot be attained, small voids may exist momentarily in the fluid chamber, thereby materially changing the resisting force offered to the moving vane by the fluid.

Bearing the above problems in mind, it is a primary object of the present invention to provide an improved mechanical vibration damping apparatus particularly adapted to aircraft control surfaces for damping destructive fluttering type vibrations of relatively small amplitudes and high frequencies.

More particularly, an object is to provide an improved damping apparatus of the above nature in which a controlled elasticity is incorporated in the structure to accommodate the relatively high resisting forces acting on the moving vane as a result of high frequency, small amplitude vibrations on the input shaft, whereby the possibility of structural failure due to extremely high torques is materially reduced. In this connection, introduction of a controlled elasticity will enable the peak torque characteristics developed in the input shaft and rotor structure to be properly phased.

Another object is to provide a novel physical arrangement between an auxiliary compensating fluid chamber and the principal fluid chamber of the damping apparatus for insuring relatively rapid fluid compensation to maintain the principal chamber filled with fluid at all times notwithstanding fluid leakage and thermal expansion or contraction over wide temperature variations.

Still other objects of the invention are to provide an improved damping apparatus which is compact, rugged, and reliable in operation.

These and further objects and advantages of this invention are attained by providing a damping apparatus of the moving vane type. The vane, itself, however, is dimensioned to be smaller than the cross-sectional dimensions of the chamber through which it moves so that a controlled gap is provided through which a portion of the fluid may pass about the edges of the vane. Further, a controlled passage means in communication with the chamber is arranged to pass a portion of the fluid from one side of the vane to the other as the vane moves through the chamber. A needle type valve is incorporated in this passage so that the resistance of the passage to fluid flow may be accurately controlled, and thus the desired damping resistance to movement of the vane by the fluid may be correspondingly controlled. Safety means are also incorporated for by-passing the fluid around the needle valve, in the event the fluid pressure exceeds a given maximum value.

The structure of the rotor and vanes themselves are such as to purposely exhibit controlled elastic properties for small amplitude high frequency vibrations. The degree of elasticity is controlled by making the rotor hub hollow and suitably dimensioning its inside and outside diameters to provide the desired elasticity in torsion. For extremely rapid small amplitude oscillatory movements of the vane as a result of high frequency small amplitude vibrations acting on the input shaft, the resisting force offered to the vane by the fluid will be relatively high, since this force is a function of the speed of the vane through the fluid. This speed will vary sinusoidally and therefore, the resisting force will increase, reach a peak value, and then decrease each half cycle of operation.

The degree of elasticity in the structure will determine in part the point at which maximum or peak torque in the rotor and vane structure is developed. It is desirable, of course, that this peak torque point be as much in phase as possible with the peak torque on the input shaft. If the structure is too rigid, the peak torque developed in the vane and rotor structure may become dangerously high since there is relatively little "give" or resilience to the vane in its movement through the fluid. Too high a torque over a small amplitude may either damage the structure or simply be stored in the inherent elasticity of the structure. This inherent elasticity, to be distinguished from the controlled elasticity incorporated in the rotor hub structure, will tend to place the peak torque value on the input shaft out of phase with the peak torque value in the vane structure.

On the other hand, if too much controlled elasticity is built into the system, much of the energy of the vibrations on the input shaft will simply be stored in the elastic system rather than dissipated. It is important therefore that the elasticity built into the system be properly controlled.

Aside from its elastic function, the hollow rotor hub also serves as a variable volume fluid compensating space. Using the hollow hub portion as a compensating space places the compensating fluid in close proximity to the principal fluid chamber so that rapid compensation can be achieved. This hollow portion includes pressure means acting to continuously force fluid from the compensating space into the fluid chamber. During normal operation of the damping apparatus, portions of the fluid will leak about the front edge of the vane as a result of the pressure of the moving vane. This fluid is passed into the compensating space and then forced back up into the fluid chamber through a reed valve structure by the pressure means. In the case of external leaks, the escaping fluid will be replaced by additional fluid from the compensating space. Further, the compensating space and pressure means will compensate for changes in the fluid volume due to temperature variations. Thus, the compensating space will maintain the principal chamber filled with fluid at all times.

A better understanding of the invention will be had by referring to a preferred form as illustrated in the acompanying drawings, in which.

Figure 1:
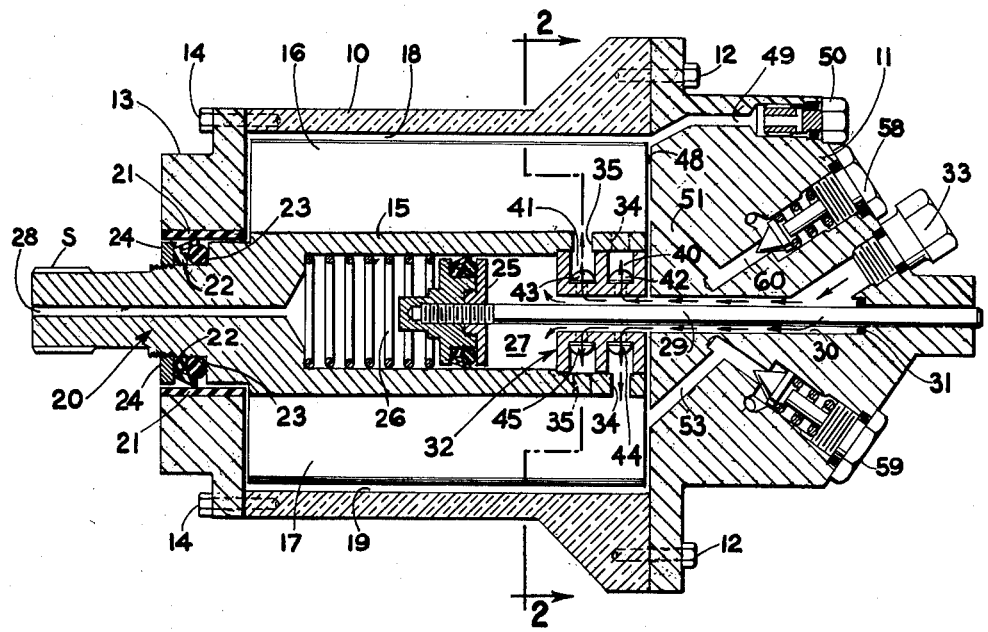
Fig. 1 is an elevational view partly in cross-section of the damping apparatus.

Referring to Fig. 1, there is shown a hollow body 10 provided with a front head block 11 secured over the front end opening in the body 10 by bolts 12. The rear end opening of the body 10 is covered by an end plate 13 similarly secured to the body by bolts 14. A rotor hub 15 fits within the hollow interior of the body 10, and as shown, is provided with opposite radially extending damping vanes 16 and 17.

As shown clearly in Fig. 2, the interior side walls of the body 10 diverge radially outwardly from the rotor hub 15, while the top and bottom interior walls are arcuately shaped whereby a pair of sector shaped chamber I and II above and below the rotor hub portion 15 respectively are defined. Each of the vanes 16 and 17 is dimensioned in its principal plane to be smaller than the cross-sectional interior dimensions of the chambers I and II as viewed in Fig. 1, so that controlled clearances or gaps as indicated at 18 and 19 exist between the vane edges and chamber walls.

The rotor hub 15 is provided with a reduced diameter end portion 20 mounted for small oscillatory motion within an opening in the end plate 13 of the body 10. As shown best in Fig. 1, this opening includes a bearing sleeve 21. The rotor end portion is provided with an annular "Teflon" seal 22 biased against the sleeve 21 by a resilient rubber O ring 23. The assembly is held in place by a retaining ring 24 threaded to the rotor end as shown. With this arrangement, fluid is sealed within the chambers I and II.

The rotor hub 15 is formed with a cylindrical hollow interior. This hollow interior not only renders the rotor more elastic in torsion, the reason for which will become clearer as the description proceeds, but also serves as a housing for suitable fluid compensating apparatus. This latter apparatus includes a piston 25 and biasing spring 26. As shown, the piston 25 is held in sealed relationship with the interior side walls of the rotor hub by a "Teflon" type annular seal and rubber backing ring similar to the seal 22 and ring 23 used on the rotor end. The use of "Teflon" seals for both the rotor bearing and the piston 25 provides a very low friction seal, resulting in a minimum starting torque to move the rotor.

The spring 26 is positioned between the rear face of the piston 25 and the lefthand end wall of the rotor hub interior and is biased to urge the piston to the right as viewed in Fig. 1. Between the front face of this piston and the right-hand end of the rotor hub, there is provided a compensating space 27, the volume of which may be varied by movement of the piston. A small air bleeder bore 28 extends out the rear of the rotor. An indicating rod 29 extends from the front face of the piston 25 through a central bore 30 and suitable sealing ring 31 in the head block 11.

The compensating space 27 is arranged to be placed in communication with the chambers I and II through a check valve structure, designated generally by the numeral 32. By this arrangement, fluid may be introduced into the chambers I and II by removing a filler plug 33 in the head block 11. As indicated by the arrows, this fluid will travel through the bore 30, into the compensating space 27, through the check valve structure 32, and through pairs of opposite openings 34 and 35 in the rotor hub to the chambers.

Figures 2, 3:
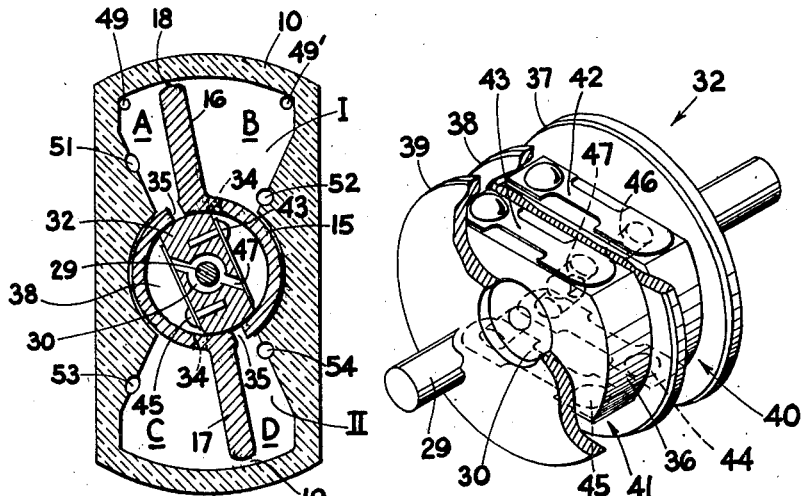
Fig. 2 is a cross-sectional view taken in the direction of the arrows 2—2 of Fig. 1.
Fig. 3 is an enlarged cut-away perspective view of the reed valve means employed in the apparatus of Figs. 1 and 2.

Referring particularly to Fig. 3, the check valve structure is shown as comprising a block shaped member 36 having a central bore registering with, and forming a continuation of, the bore 30. The indicating rod 29 extends through this bore. The block member 36 is provided with three radially extending annular flanges 37, 38, and 39, dimensioned to engage in sealing relationship the cylindrical interior side walls of the rotor hub 15 as clearly shown in Fig. 1. With this arrangement, the inner side walls of the outer flanges 37 and 39 and the opposite side walls of the center flange 38 define, together with the interior end portion of the hub 15, annular fluid passages 40 and 41.

As can be seen from Figs. 1 and 2, the opposite openings 34 in the rotor hub 15 are in communication with the annular passage 40 of the check valve structure, while the opposite openings 35 are axially spaced with respect to the axis of bore 30 to open into the annular passage 41. If the portion of the upper chamber I on the left side of the vane 16, as seen in Fig. 2, is designated A, the portion to the right of the vane 16 designated B, and the corresponding portions of the lower chamber II designated C and D respectively, it will be noted that the opposite openings 34 communicate with chamber portions B and C while the opposite openings 35 communicate with chambers A and D.

As shown clearly in Figs. 1 and 3, the block shaped member 36 is provided on opposite flat surfaces with pairs of reeds in the form of flat resilient strips 42, 43, and 44, 45. The upper reeds 42 and 43 are disposed in the annular passages 40 and 41 respectively and have fixed ends secured to the member 36 and free ends overlying a pair of lateral bores 46 and 47. These bores respectively place the annular passages in communication with the central bore 30 when the reeds are open. Similarly, the lower pair of reeds 44 and 45 have fixed ends secured to the opposite under flat surface of the member 36 and free ends overlying a pair of lateral bores communicating with the central bore 30. Each reed acts as a one-way check valve permitting fluid to pass from the central bore and out through one of the lateral bores, forcing the free end of the reed upwardly. Any fluid tending to pass from the chambers down through the lateral bores, on the other hand, is blocked by the reeds, the pressure of fluid in this direction tending to force the free ends of the reeds into tighter overlying engagement with the lateral bore openings. The light flexible nature of the reeds provides a fast acting check valve structure. While two sets or pairs of reeds have been shown, only one reed is necessary for each annular passage. Thus, for example, the upper reeds 42 and 43 or the lower reeds 44 and 45 alone would be sufficient.

Figures 4, 5:
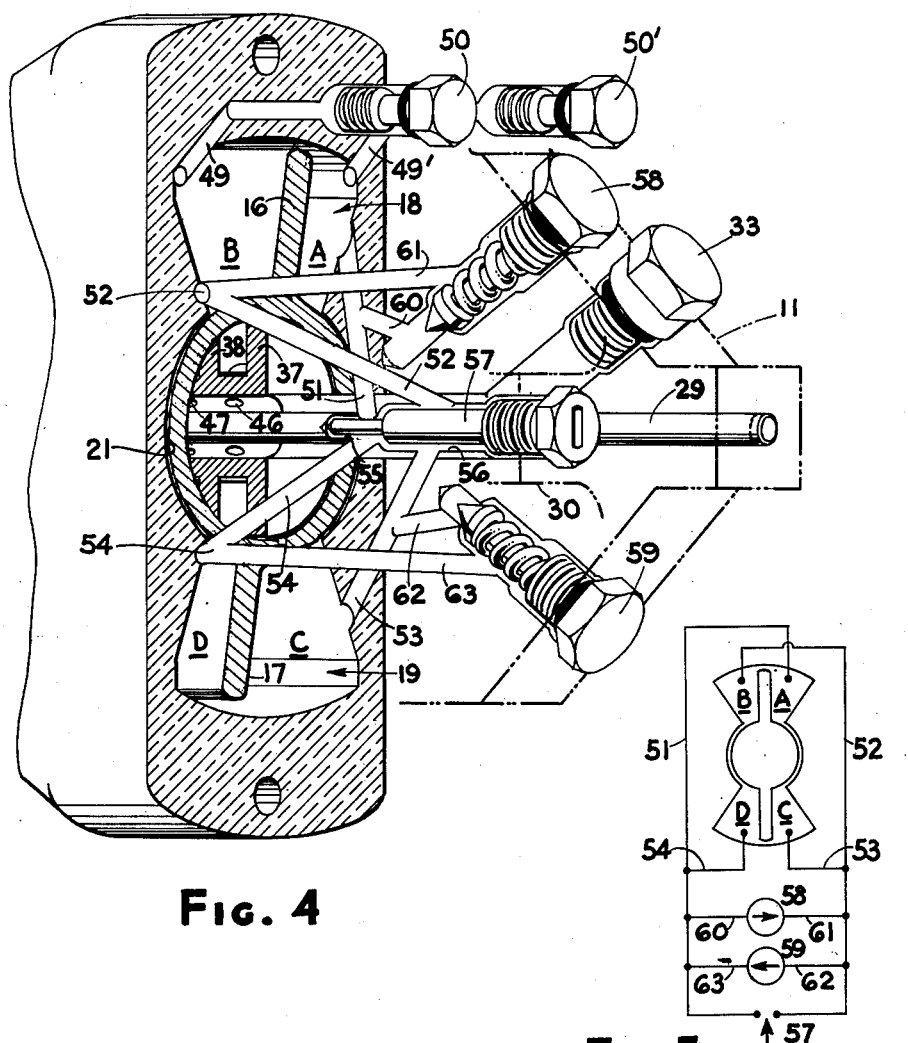
Fig. 4 is another enlarged cut-a-way perspective view partly schematic in form, illustrating various fluid controlled passage means.
Fig. 5 is a diagram illustrating schematically the various fluid flow path connections of the apparatus of Fig. 4.

Referring particularly to Figs. 1, 2, and 4, the front face 48 of the head block covering the front opening of the body 10 is provided with a plurality of port openings communicating with the chambers I and II. Two of these ports 49 and 49' are located in the upper left and righthand corners of the chamber portions A and B as seen in Fig. 2, and are closed off by suitable plugs 50 and 50', respectively. These ports serve as air bleeder passages to enable the removal of any air remaining in the chambers after fluid has been introduced.

The remaining ports serve as controlled passage means for passing a portion of the fluid from one side of each vane to the other. Communicating with portion A of the chamber I to the left of the vane 16, as shown in Fig. 2, is a port passage 51. In the portion B is another port passage 52. Similarly, the left and right portions C and D of the lower chamber II are in communication with port passages 53 and 54.

Referring particularly to Fig. 4, it will be seen that the passages 51 and 54 from the chamber portions A and D, respectively, converge in an annular cavity 55 in the head block 11. The passages 52 and 53 from the chamber portions B and C respectively, converge in a larger annular cavity 56 forming an extension of the cavity 55. A needle valve 57 projects into these cavities, and as shown is threadedly secured to the head block 11 so that its extent into the cavities is adjustable. Accordingly, by threading the needle valve further into the cavities, the annular communicating space between the cavities is decreased so that fluid passing from either of the port passages 52 and 53, in the larger cavity 56, to either of the port passages 51 and 54, in the smaller cavity 55, is correspondingly restricted.

Referring to both Figs. 2 and 4, assume that the vane is moving in a clockwise direction as viewed in Fig. 2 so that the chamber portions A and D are increasing in volume and the chamber portions B and C are decreasing in volume. This vane motion will force a portion of the fluid out port passages 52 and 53, past the annular communication between the needle valve cavities 56 and 55, and back through passages 51 and 54. It will be clear, therefore, that the resistance the fluid offers to the moving vanes may be controlled in part by controlling the rate at which fluid can pass through the needle valve cavities.

In order to prevent possible damage to the damping apparatus or control shaft to which it is connected in the event an extraordinarily large torque is established, a pair of maximum torque relief valves 58 and 59 are incorporated in the head block. As shown clearly in Fig. 4, the torque valve 58 communicates with by-pass passages 60 and 61 connecting port passages 51 and 52 together to by-pass the needle valve. Similarly, the torque valve 59 communicates with by-pass passages 62 and 63 connecting port passages 53 and 54 together to by-pass the needle valve. Each torque valve is spring controlled as shown, and may be set to open only under a certain given maximum fluid pressure. Thus, when the pressure of the fluid in the port passages exceeds a given maximum value, as would result were an extraordinarily large torque applied to the rotor hub 15, the torque relief valves 58 and 59 open, thereby permitting a portion of the fluid to pass from one side of each vane to the other without passing through the needle valve.

The various fluid passages described above are shown in schematic form in Fig. 5. In this drawing, the various lines are identified by the numerals designating the corresponding fluid passages in Fig. 4. The manner in which the maximum torque relief valves 58 and 59 bypass the needle valve 57 will be immediately apparent from the drawing.

In designing the described damping apparatus, the rotor is preferably made of stainless steel, while the hollow body portion 10 is made of bronze. These metals have substantially the same thermal expansion coefficients and provide excellent bearing members. Further, a synthetic silicone type damping fluid is preferred due to its relatively constant viscosity over wide temperature variations.

In operation, the reduced rotor end portion 20 shown in Fig. 1 is provided with splines S for securement directly to a shaft on an aircraft control surface or other element subject to oscillatory vibrations. As previously noted, the vibrations to be damped are characterized by small amplitudes and relatively high frequencies. Therefore, the arcuate movement of the rotor hub 15 and the vanes 16 and 17 within the body 10 will ordinarily take place well within the limits determined by the diverging interior side walls of the principal fluid chambers.

Fluid is introduced into the chambers I and II and the compensating space 27 through the inlet that is normally closed by the fill plug 33. This fluid, as previously described, passes down the bore 30, through the reed valves 42, 43, 44, 45, into the annular passages 40 and 41, and through openings 34 and 35 to the chambers. Normally, any air or gas in the chambers will be exhausted prior to filling, but in the event any gas should appear in the chambers it may be removed through the bleeder passages 49 and 49'.

After the principal fluid chambers I and II have been completely filled, continued forcing of fluid through the bore 30 will urge the piston 25 to the left compressing the spring 26. The indicating rod 29 will show when the piston reaches an intermediate position insuring that the compensating space 27 and chambers I and II are filled with fluid under pressure. After the filling is complete, the plug 33 is secured in place.

Movement of the vanes 16 and 17 back and forth through the chambers I and II as a result of oscillations imparted to the rotor from buffeting or fluttering of the aircraft control surfaces, will be impeded by the fluid in the chambers. A large portion of the fluid will be forced around the vane edges through the controlled clearances, or gaps 18 and 19, thereby dissipating the energy on the rotor input shaft. These gaps are of sufficient size to control, to a considerable extent, the maximum resistances offered to vane movement during relatively high frequency oscillations of the vanes. For example, if these gaps or clearances are too small, the resistance to rapid vane movements will be large and too much of the movement imparted to the rotor and vanes will be accommodated by the inherent elasticity of the structure. Particularly is such the case where small amplitude vibrations are involved. On the other hand, if the gaps are too large, there will not be sufficient resistance offered to the vane movement for effective damping.

Another portion of the fluid in the chambers I and II will be forced through the passages and the needle valve structure as previously described. The needle valve may therefore be used to control, to a certain extent, the resistance offered by the fluid to movement of the vanes. Opening up of the needle valve will permit more fluid to pass from one side of the vane to the other, which, in addition to the fluid passing about the vane edges, will result in relatively less resistance to vane movement.

Closing down of the valve on the other hand, will result in less fluid flow through the passages and in more fluid being forced around the vane edges through the gaps 18 and 19.

For effectively damping relatively high frequency small amplitude vibrations, a given degree of controlled elasticity is provided in the system by the provision of the hollow rotor. As previously described, this elastic torsion built into the rotor enables the vanes to "give" or be angularly deflected a determined amount per unit force. Therefore, the relatively high torques developed in the structure as a result of the high speed of the vanes through the fluid are partially stored as energy in the controlled elastic system and partially dissipated by fluid flow past the vane edges and through the controlled passage means. The higher the frequency, the greater will be the vane speed through the fluid and therefore, the greater will be the resisting forces. Higher resisting forces result in a greater proportion of the energy being stored in the controlled elasticity of the system thereby relieving the structure of being subject to too high torque values. Accordingly, by incorporating a degree of controlled elasticity, the maximum torques to which the rotor and input shaft structures may be subject, are limited.

By limiting the maximum torques, the proportion of energy stored in the unavoidable inherent elasticity of the system is limited, and therefore, the peak torque phase characteristics may be controlled. The reason these peak torque phase characteristics may be controlled in this manner is because these characteristics depend upon the peak magnitude of the torque, which in turn is roughly proportional to the square of the peak speed of vane movement. On the other hand, the controlled elasticity only adds to the torque magnitude a value that varies directly with the elastic angular displacement. Since the angular displacement and speed are directly related, the maximum or peak vane speed is controlled and may be limited by the degree of controlled elasticity incorporated. In other words, if there were no controlled elasticity, there would be little "give" or resilience, and the vanes would actually reach a higher peak speed than otherwise, thereby resulting in a very high resisting torque in view of the variation of torque with the square of the speed. As stated, this high resisting torque would be largely stored as energy in the inherent elasticity of the structure and consequently upset the desired in phase peak torque characteristics. Further, without the controlled elasticity, the torque magnitudes attained may be sufficiently high to cause a structural failure.

In the case of the lower frequency, larger amplitude vibrations, the controlled elasticity would not materially affect the damping efficiency since the relatively slower movements of the vanes through the fluid result in lower peak torque values. The lower the torque, the less will be the elastic angular deflection of the vanes and therefore the less will be the proportion of energy stored rather than dissipated. Thus, for the lower frequency larger amplitude vibrations, the damping mechanism operates in a conventional manner, and in the event an extraordinary increase in the applied torque should occur, the maximum torque relief valves will operate to shunt out the needle valve control and thereby lessen the fluid resistance to vane movement.

From the above, it will be seen that there are essentially three factors to be considered in analyzing the effectiveness of the mechanism in damping high frequency, small amplitude vibrations: (1) The energy dissipation as a result of fluid flow about the vane edges; (2) the energy dissipation as a result of fluid flow through the control passages and needle valve structure; and (3) the effect of the controlled elasticity in the structure. The first two factors determine the damping effectiveness insofar as they act to dissipate the vibration energy. The last factor limits the peak vane speed and thereby the peak torque developed. As previously described, so limiting the peak torque developed reduces the possibility of exceeding the strength limits of the structure, and enables the phase relationship between the peak torque on the input shaft with respect to the resisting torque developed in the vane and rotor structure to be controlled.

During operation of the damping mechanism on an aircraft, for example, the ambient temperature may vary over wide limits. Under sub-zero conditions, the fluid in the chambers will contract, whereas at very high temperatures, the fluid will expand. Such contraction and expansion will result in a gradual fluid flow adjustment between the chambers and the compensating space 27. In the case of contraction, fluid from the compensating space will be urged by the piston 25 and spring 26 through the reed valve structure 32 into the principal chambers to maintain them filled. In the case of expansion, the fluid in the chambers will be forced about the front vane edges adjacent the front face 48 of the head block 11, down into the bore 30, and thence into the compensating space 27 wherein it will be accommodated by movement of the piston 25 to the left. In the case of exterior leaks, fluid from the compensating space will be forced up through the reed valves into the chambers to replace the lost fluid.

The above described compensating operations take place over a relatively long period of time. In order to insure that the chambers are maintained filled at every instance, it is important that a relatively rapid exchange of flow take place between the compensating space and the fluid chambers. During the rapid oscillation of the vanes back and forth, reduced pressure areas will be momentarily produced in the various chamber portions from which the vanes are receding. Correspondingly, increased dynamic pressures will be developed in the chamber portions into which the vanes are advancing. The pressure established by the spring 26 in the compensating space is normally less than the dynamic fluid pressures developed adjacent the advancing face of the vanes. Therefore, fluid which unavoidably leaks about the front of the vane edges adjacent the front face 48 of the head block 11 will be forced down into the bore 30 and subsequently returned to the reduced pressure sides of the vanes through the reed valves and openings 34 and 35 in the rotor hub.

It is important that the annular passages 40 and 41 in the check valve structure and the opening 34 and 35 not serve as a means for the fluid to get directly from one side of the vane to an opposite side, since it is desired to control this flow by the gaps and needle valve. Such action is prevented by the annular construction of the passages 40 and 41 which isolate the fluid passing in the openings 34 from the fluid passing through the openings 35.

Since the cycle of flow of the leakage about the front vane edges, into the bore 30, and through the reed valves occurs each time the vanes change direction, it is important that the check valves be very fast acting. By employing reeds of small mass and high resonant frequency, the necessary high speed action is attained.

Summarizing, it will be seen that the compensating space serves three purposes: (1) It will compensate for exterior leakage and maintain the fluid chambers filled at all times; (2) it compensates for contraction and expansion of the fluid with varying temperatures; and (3) it continuously returns fluid which leaks about the front vane edges into the bore 30, to the fluid chambers.

While the invention has been described in connection with one specific embodiment, it is to be understood that various modifications thereof within the scope and spirit of the principles set forth will occur to those skilled in the art. The damping apparatus accordingly is not to be thought of as limited to the specific apparatus disclosed for illustrative purposes.

What is claimed is:

1. A damping apparatus comprising: a body defining at least one hollow chamber; a rotor passing within said body; at least one vane secured to said rotor and extending radially in said chamber for arcuate movement through said chamber by rotational movement of said rotor, said rotor being hollow whereby said vane and rotor exhibit a controlled elasticity; means for introducing fluid into said chamber for resisting movement of said vane, said vane extending a radial distance in its principal plane less than the cross-sectional internal radial dimension of said chamber so that a controlled gap exists between the outer edge of said vane and the outer wall of said chamber; and controlled passage means exterior of and in communication with said chamber for passing a portion of said fluid from one side of said vane to the other during movement of said vane, said controlled passage means including a needle valve whereby the resistance to fluid flow through said passage means may be varied to control the resistance offered to movements of said vane by said fluid in the chamber.

2. A damping apparatus according to claim 1, including a by-pass passage, by-passing said needle valve, and a maximum torque relief valve in said by-pass passage adapted to open only when the pressure of said fluid across said needle valve exceeds a given value.

3. A damping apparatus comprising: a hollow body open at its front and rear ends; a head block secured to the front end of said body; an end plate secured to the rear end of said body, said end plate having a central opening; a rotor journaled in said opening and having a cylindrical rotor hub extending axially within said hollow body, the interior side walls of said hollow body diverging radially outwardly from said rotor hub and the top and bottom interior walls of said body being arcuately shaped whereby closed upper and lower sector shaped chambers are defined by said side, top, and bottom walls and the cylindrical exterior of said rotor hub; vanes extending radially from said rotor hub into said upper and lower chambers, respectively, for oscillatory arcuate movement through said chambers upon oscillatory movements of said rotor; said rotor hub having a hollow portion of variable volume; communicating means between said hollow portion and said chamber; means for introducing viscous fluid in said hollow portion; pressure means for urging fluid from said hollow portion through said communicating means to said chambers for resisting oscillatory movements of said vanes, said vanes being dimensioned in their principal planes to be smaller than the internal cross-sectional dimensions of said chambers so that controlled gaps exist between the edges of the vanes and said top and bottom walls of the chambers; and controlled passage means exterior of, and in communication with said chambers for passing a portion of said fluid from one side of each vane to the other respectively, during oscillatory movements of said vanes.

4. A damping apparatus according to claim 3, in which said pressure means includes a piston, and biasing means urging said piston into said hollow portion whereby fluid in said chambers is maintained under pressure.

5. A damping apparatus according to claim 4, in which said communicating means includes check valve means comprising a member having a central bore communicating with said hollow portion and a pair of lateral bores passing from said central bore to said chambers respectively; and reeds in the form of flat resilient strips having fixed ends secured to said member and free ends overlying the outer ends of said bores respectively.

6. A damping apparatus according to claim 3, in which said controlled passage means includes a needle valve whereby the impedance to fluid flow through said passage means may be varied to control the resistance offered to oscillatory movements of said vanes by said fluid in the chambers.

7. A damping apparatus according to claim 6, including by-pass passages shunting the passage means associated with each of said chambers, respectively, whereby said needle valve is by-passed, and a maximum torque relief valve in each by-pass passage adapted to open only when the pressure of fluid across said needle valve exceeds a given value.

References Cited in the file of this patent

UNITED STATES PATENTS

| | | |
|---|---|---|
| 1,072,770 | Peteler | Sept. 9, 1913 |
| 2,038,598 | Peo | Apr. 28, 1936 |
| 2,419,651 | Magrum | Apr. 29, 1947 |
| 2,469,488 | Woods | May 10, 1949 |
| 2,683,505 | Girard | July 13, 1954 |

FOREIGN PATENTS

| | | |
|---|---|---|
| 20,473 | France | Nov. 30, 1917 |